United States Patent
Dror et al.

(10) Patent No.: US 12,235,922 B2
(45) Date of Patent: Feb. 25, 2025

(54) DELETING WEB BROWSER DATA

(71) Applicant: ISLAND TECHNOLOGY INC., Dallas, TX (US)

(72) Inventors: Amit Dror, Kfar Saba (IL); Dor Rotman, Rishon Letsiyon (IL); Roi Leibovich, Tel Aviv (IL); Dan Amiga, Ramat Hasharon (IL)

(73) Assignee: ISLAND TECHNOLOGY INC., Dallas, TX (US)

( * ) Notice: Subject to any disclaimer, the term of this patent is extended or adjusted under 35 U.S.C. 154(b) by 0 days.

(21) Appl. No.: 18/080,775

(22) Filed: Dec. 14, 2022

(65) Prior Publication Data
US 2023/0185866 A1    Jun. 15, 2023

Related U.S. Application Data

(60) Provisional application No. 63/289,169, filed on Dec. 14, 2021.

(51) Int. Cl.
| | | |
|---|---|---|
| *G06F 16/20* | (2019.01) | |
| *G06F 16/23* | (2019.01) | |
| *G06F 16/90* | (2019.01) | |
| *G06F 16/955* | (2019.01) | |

(52) U.S. Cl.
CPC ...... *G06F 16/9566* (2019.01); *G06F 16/2379* (2019.01)

(58) Field of Classification Search
CPC .......... G06F 16/9566; G06F 16/2379
See application file for complete search history.

(56) References Cited

U.S. PATENT DOCUMENTS

| | | | | |
|---|---|---|---|---|
| 7,020,658 B1 * | 3/2006 | Hill | ........ | G06F 16/10 |
| | | | | 707/999.102 |
| 2011/0119268 A1 | 5/2011 | Rajaram et al. | | |
| 2017/0091303 A1 * | 3/2017 | Rashid | ........ | G06N 20/00 |
| 2020/0076906 A1 * | 3/2020 | Zhou | ........ | H04W 12/08 |

FOREIGN PATENT DOCUMENTS

| | | |
|---|---|---|
| AU | 2013206427 A1 | 7/2013 |
| CN | 103020214 A | 4/2013 |
| EP | 3314860 B1 | 1/2021 |

* cited by examiner

*Primary Examiner* — Kristopher Andersen
(74) *Attorney, Agent, or Firm* — AlphaPatent Associates Ltd.; Daniel J. Swirsky

(57) ABSTRACT

Deleting web browser data by maintaining a set of Uniform Resource Locators (URL) hostnames, where a URL hostname is added to the set of hostnames responsive to the URL being accessed by a web browser and responsive to determining that predefined grouping conditions that define a logical group is met by the URL, and deleting one or more types of data maintained by the web browser in association with URLs associated with the hostnames in the set of hostnames, where the deleting is performed in accordance with a predefined deletion policy that specifies the types of data that are to be deleted and predefined deletion conditions, and where the deleting is performed responsive to determining that the predefined deletion conditions are met and determining that the web browser is not currently accessing any URL associated with the hostnames in the set of hostnames.

7 Claims, 6 Drawing Sheets

```
private async startTracking(
    matchedUrlObject: URLObjectDto,
    hostToTrack: string,
    isUrlObjectBased: boolean,
    ruleDto: RuleDto
) {
    const trackingKey = matchedUrlObject.id await this.deletionScopesDbProvider.createOrUpdate(
        trackingKey,
        createCallback: () => {
            this.logger.info(logMessage: 'New deletion scope created for domain, starting to track open tabs with key')
            return {
                isUrlObjectBased,
                key: matchedUrlObject.id,
                browsedDomains: [hostToTrack],
                timestamp: Date.now(),
                ruleId: ruleDto.id,
            }
        },
        UpdateCallback: (existingScope :DeletionScope ) => {
            BrowsingDataDeletionTrackingService.updateScopeTimestamp(existingScope)
            if (existingScope.browsedDomains.indexOf(hostToTrack) === -1) {
                existingScope.browsedDomains.push(hostToTrack)
            }
            this.logger.info(logMessage: 'Extended the deletion scope sliding window for domain')
        }
    )
}
```

Fig. 2

```
private async getInactiveScopes(timeSpanInMillis): Promise<DeletionScope[]> {
    const allDeletionScopes = await this.deletionScopesDbProvider.getAllAsync()

const inactiveScopes = await asyncFilter(allDeletionScopes, predicate: async (scope
:DeletionScope ) => {
        if (Date.now() - scope.timestamp < timeSpanInMillis) return false const isInUse = await this.isExistingTabUsingDeletionScope(scope)

if (isInUse) {
            await this.deletionScopesDbProvider.tryUpdateCscope.key, updateCallback:
(existingScope) => {
                BrowsingDataDeletionTrackingService.updateScopeTimestamp(existingScope)
            })
        }
        return !isInUse
    })
    return inactiveScopes
}
```

Fig. 3

```
0  "156c632d-8838-4128-9443-c8df33923acd" {isUrlObjectBased: true, key: '156c6328-8838-
   412b-9443-c8df33923acd', browsedDomains: Array(5), . . .
      browsedDomains: Array(5)
         0: "login.salesforce.com"
         1: "c.5alesforce.com"
         2: "uww.salesforce.com"
         3: "service.force.com"
         4: "help.salesforce.com"
         length: 5
      isUrlObjectBased: true
      key: "156c632d-8838-4128-9443-c8df33923acd"
      ruleId: "hbafca74-2478-43b4-a288-28c939111e96"
      timestamp: 1637846279829

1  "4c752846-a8ef-4ce2-97e8-d698a485663b" v{isUrthjectBased: true, key: '4c752846-a8ef-
   4ce2-97e8-d698ad85663h', brousedDomains: Array(2), . . .
      browsedDomains: Array(2)
         0: "zoom.us"
         1: "support.zoom.us"
         length: 2
      isUrlObjectBased: true
      key: "4c752846-a8ef-4ce2-97e8-d698ad85663b"
      ruleId: "bbafca74-2478-43b4-a288-28c939111e96"
      timestamp: 1637846273162
```

Fig. 4

DELETING WEB BROWSER DATA

BACKGROUND

Web browsers that store sensitive data, such as cookies, typically allow users to either manually delete such data or configure the web browsers to delete all such data, such as when terminating execution of the web browser. Unfortunately, while such mechanisms provide a modicum of protection against malicious actors who attempt to access such data, they require a level of user awareness and diligence that is not always available.

SUMMARY

In one aspect of the invention a method is provided for deleting web browser data, the method including maintaining a set of hostnames of Uniform Resource Locators, where a hostname of a Uniform Resource Locator is added to the set of hostnames responsive to the Uniform Resource Locator being accessed by a web browser, and where the hostname of the Uniform Resource Locator is added to the set of hostnames responsive to determining that each condition in a set of one or more predefined grouping conditions that define a logical group is met by the Uniform Resource Locator, and deleting one or more types of data maintained by the web browser in association with Uniform Resource Locators associated with the hostnames in the set of hostnames, where the deleting is performed in accordance with a predefined deletion policy that specifies the one or more types of data that are to be deleted and one or more predefined deletion conditions, and where the deleting is performed responsive to determining that each condition in the set of one or more predefined deletion conditions is met and determining that the web browser is not currently accessing any Uniform Resource Locator associated with the hostnames in the set of hostnames.

In another aspect of the invention the predefined grouping conditions includes a condition that logically groups Uniform Resource Locators that have a predefined common Uniform Resource Locator portion.

In another aspect of the invention the predefined grouping conditions includes a condition that logically groups Uniform Resource Locators that belong to a predefined group of Uniform Resource Locators.

In another aspect of the invention the predefined grouping conditions includes a condition that logically groups Uniform Resource Locators that are associated with a predefined web site category.

In another aspect of the invention the predefined grouping conditions includes a condition that logically groups Uniform Resource Locators that are associated with a predefined risk reputation.

In another aspect of the invention the deleting is performed after a predefined time period elapses after determining that the web browser is not currently accessing any Uniform Resource Locator associated with the hostnames in the set of hostnames.

In another aspect of the invention the deletion policy specifies one or more logical groups of hostnames to which the deletion policy is to be applied.

In another aspect of the invention further includes configuring the web browser to perform the maintaining and the deleting.

In another aspect of the invention a system is provided for deleting web browser data, the system including a hostname manager configured to maintain a set of hostnames of Uniform Resource Locators, where a hostname of a Uniform Resource Locator is added to the set of hostnames responsive to the Uniform Resource Locator being accessed by a web browser, and where the hostname of the Uniform Resource Locator is added to the set of hostnames responsive to determining that each condition in a set of one or more predefined grouping conditions that define a logical group is met by the Uniform Resource Locator, and a data deletion manager configured to delete one or more types of data maintained by the web browser in association with Uniform Resource Locators associated with the hostnames in the set of hostnames, where the data deletion manager is configured to delete the one or more types of data in accordance with a predefined deletion policy that specifies the one or more types of data that are to be deleted and one or more predefined deletion conditions, and where the data deletion manager is configured to delete the one or more types of data responsive to determining that each condition in the set of one or more predefined deletion conditions is met and determining that the web browser is not currently accessing any Uniform Resource Locator associated with the hostnames in the set of hostnames.

In another aspect of the invention the data deletion manager is configured to delete the one or more types of data after a predefined time period elapses after determining that the web browser is not currently accessing any Uniform Resource Locator associated with the hostnames in the set of hostnames.

In another aspect of the invention the hostname manager and the data deletion manager are assembled with the web browser.

BRIEF DESCRIPTION OF THE DRAWINGS

Aspects of the invention will be understood and appreciated more fully from the following detailed description taken in conjunction with the appended drawings in which:

FIG. 2 is a source code example for adding a URL hostname to a set of hostnames, operative in accordance with an embodiment of the invention;

FIG. 3 is a source code example for detecting inactivity of webpages, operative in accordance with an embodiment of the invention;

FIG. 4 is an example showing how sets of URL hostnames may be maintained by a Google Chrome™ web browser using IndexedDB, operative in accordance with an embodiment of the invention.

DETAILED DESCRIPTION

Figure 1A:
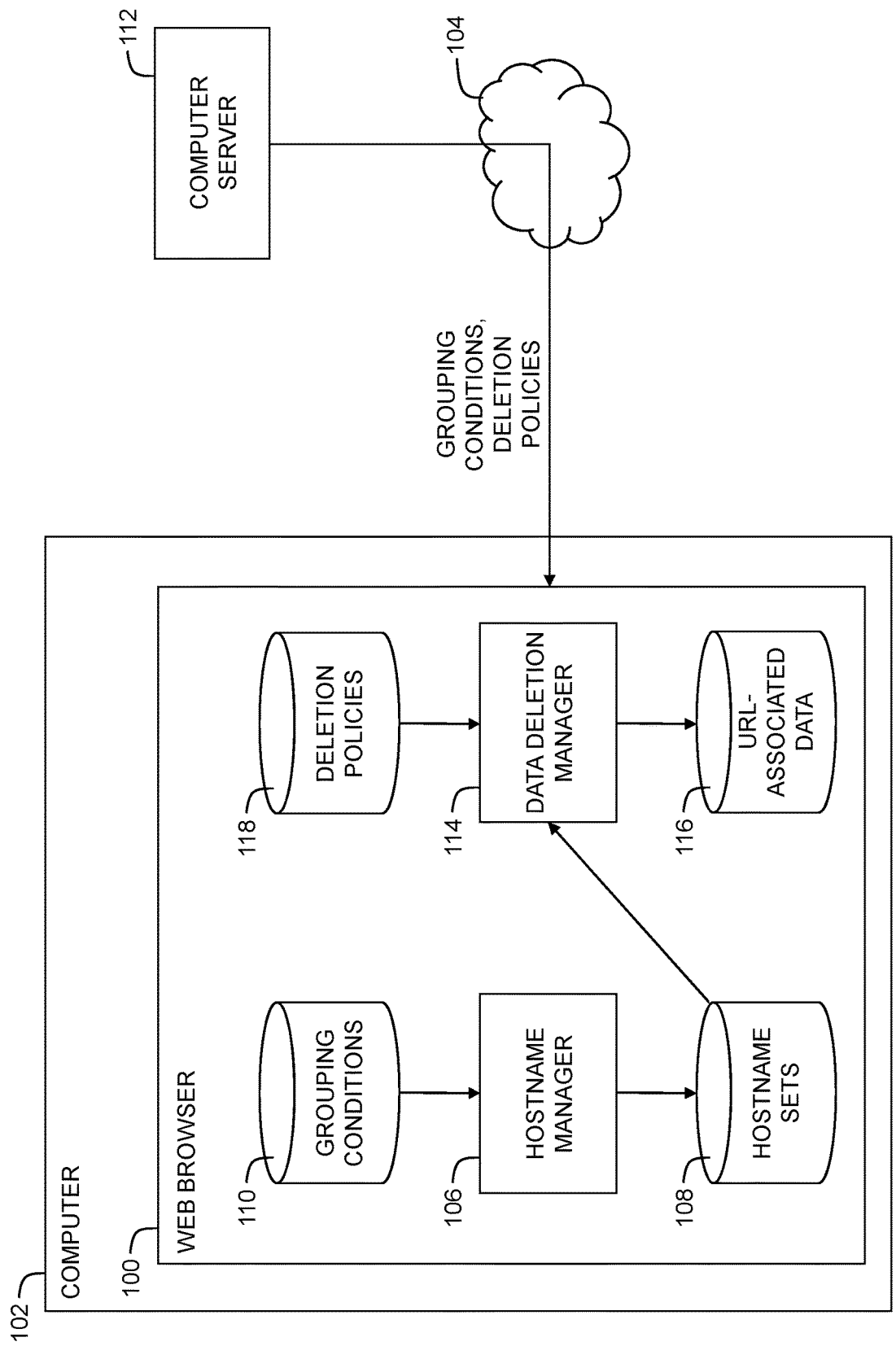
FIG. 1A is a simplified conceptual illustration of a system for deleting web browser data, constructed and operative in accordance with an embodiment of the invention.
Figure 1B:
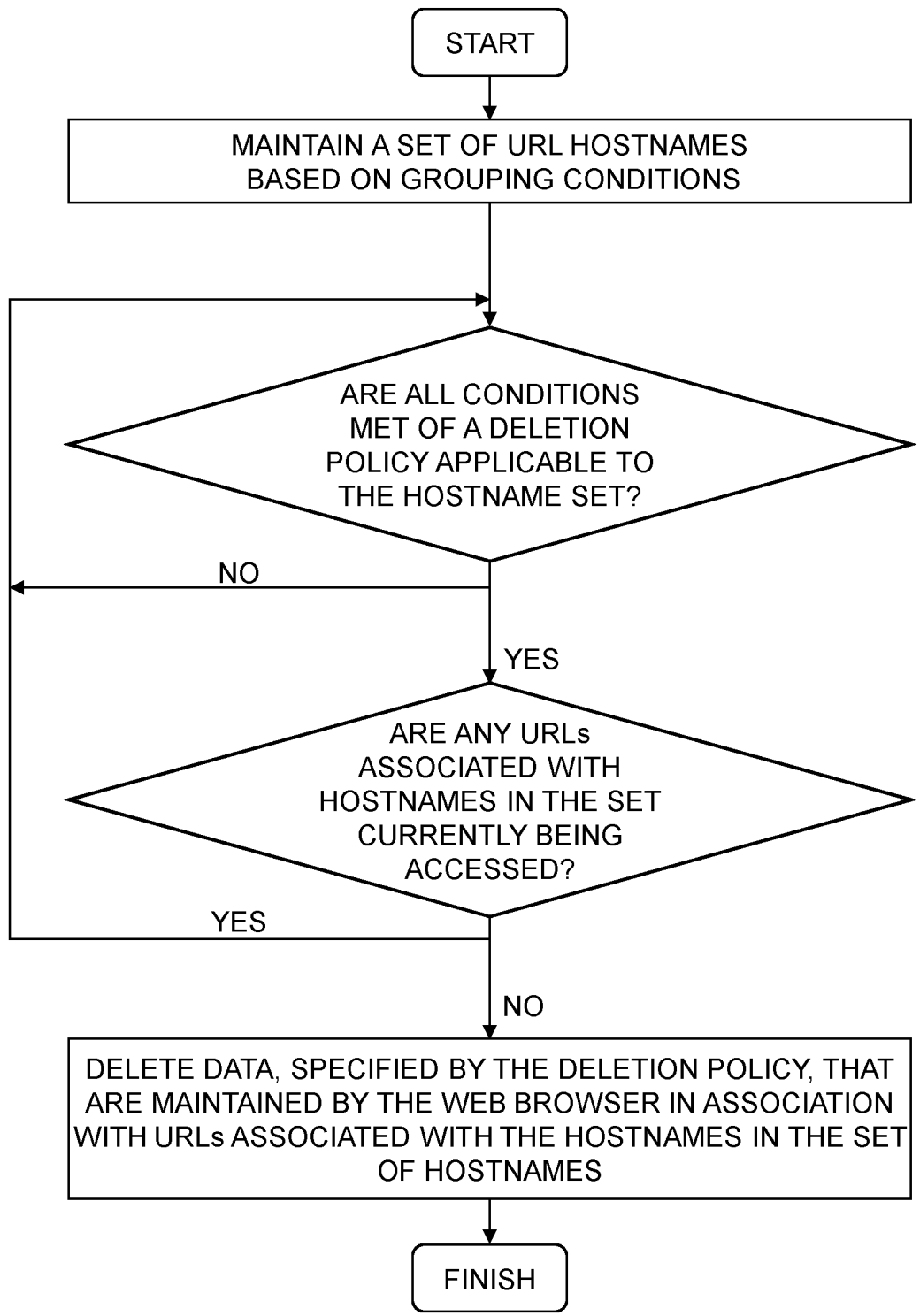
FIG. 1B is a simplified flowchart diagram of an exemplary method of operation of the system of FIG. 1A, operative in accordance with an embodiment of the invention.

Reference is now made to FIG. 1A, which is a simplified conceptual illustration of a system for deleting web browser data, constructed and operative in accordance with an embodiment of the invention, and additionally to FIG. 1B, which is a simplified flowchart diagram of an exemplary method of operation of the system of FIG. 1A, operative in accordance with an embodiment of the invention. In the system of FIG. 1A and method of FIG. 1B, a web browser 100 is configured to incorporate the functionality of conventional web browsers, such as those based on the Google™ Chromium™ architecture, and is additionally configured to operate as is described hereinbelow. Web browser 100 may be hosted by any computing device, such as by a host computer 102 that is connected to a computer network 104, such as the Internet.

Web browser 100 includes a hostname manager 106 that is configured to maintain one or more sets 108 of hostnames of Uniform Resource Locators (URLs) that are accessed by web browser 100. When web browser 100 accesses a URL, hostname manager 106 determines whether the URL meets the conditions that are specified in one or more predefined sets 110 of grouping conditions, where each set 110 of grouping conditions defines a logical group of URLs. For example, a set 110 may include one or more of the following grouping conditions:

URLs that have a common portion, such as URLs that include the same hostname (e.g., 'salesforce.com')

URLs whose hostnames are found in a predefined list of multiple related hostnames (e.g., that are shared by the same application)

URLs that belong to a predefined group of URLs

URLs that are associated with the same website category, such as may be provided by a third-party website category provider URLs that share the same risk reputation, such as may be provided by a third-party website risk reputation provided.

Hostnames of URLs that are accessed by web browser 100 and that meet the same conditions that are specified in a given set 110 of grouping conditions are added by hostname manager 106 to the same set 108 of hostnames. Thus, for example, if a given set 110 of grouping conditions specifies that URLs that are associated with the same website category are to be logically grouped together, hostnames of URLs that are associated with a website category of "banking websites" are all added by hostname manager 106 to one set 108 of hostnames, while hostnames of URLs that are associated with a website category of "entertainment websites" are all added by hostname manager 106 to a different set 108 of hostnames. Web browser 100 may be preconfigured with sets 110 of grouping conditions. Additionally or alternatively, sets 110 of grouping conditions may be provided to web browser 100 by a system administrator, such as from a computer server 112 in accordance with techniques described in U.S. patent application Ser. No. 17/740,457.

Web browser 100 further includes a data deletion manager 114 that is configured to delete one or more types of data 116 that are maintained by web browser 100 in association with the hostnames in any set 108 of hostnames. Web browser 100 deletes data in accordance with predefined deletion policies 118 that specify the types of data that are to be deleted, as well as one or more deletion conditions. Each deletion policy 118 also preferably specifies one or more logical groups of hostnames to which the deletion policy 118 is to be applied.

Some examples of types of data that deletion policies 118 may specify for deletion include cookies, cache data, HTML5 localStorage, and browsing history. Some examples of deletion conditions include:

A predefined time period has elapsed in which no keyboard or mouse interactions were performed on any webpage associated with any hostnames in a set of hostnames A web browser tab was closed in which a webpage associated with any hostnames in a set of hostnames was displayed The computer was locked A predefined time period has elapsed during which the computer that hosts the web browser was idle The web browser self-terminates its execution The web browser was restarted after its execution was terminated not by the web browser The current time is a specified time of day Specified computer operations have changed—e.g., Anti Virus software stops running on the computer that hosts the web browser Specific computer network characteristics have changed—e.g., the computer has switched its connection from an authorized network to an unauthorized network The web browser or the computer that hosts the web browser receives an instruction from a system administrator—e.g., to log out all users from salesforce.com URLs.

For each given set 108 of hostnames, and for each given deletion policy 118 that is applicable to the given set 108 of hostnames, web browser 100 determines whether each of the deletion conditions in the given deletion policy 118 is met, and further determines whether web browser 100 is currently accessing any URL associated with the hostnames in the given set 108 of hostnames. If each of the deletion conditions in the given deletion policy 118 is met, and if web browser 100 is not currently accessing any the URL associated with the hostnames in the given set 108 of hostnames, web browser 100 deletes the types of data specified by the given deletion policy 118 that are maintained by web browser 100 in association with the hostnames in the given set 108 of hostnames. Web browser 100 is optionally configured to perform the deletion only after a predefined "grace" period of time elapses after determining that web browser 100 is not currently accessing any the URL associated with the hostnames in the given set 108 of hostnames, where the grace period may be indicated by the given deletion policy 118. Web browser 100 may be preconfigured with deletion policies 118. Additionally or alternatively, deletion policies 118 may be provided to web browser 100 by a system administrator, such as from computer server 112 in accordance with techniques described in U.S. patent application Ser. No. 17/740,457.

Source code examples for implementing aspects of the system of FIG. 1A and method of FIG. 1B are shown hereinbelow with reference to FIGS. 2 and 3. An example showing how sets of hostnames 108 may be maintained by a Google Chrome™ web browser is shown hereinbelow with reference to FIG. 4.

A source code example for adding a hostnames to a set of hostnames is shown in FIG. 2. In this example a data structure is maintained for storing hostnames of interest. When a URL is accessed by a web browser, such as by web browser 100 of FIG. 1A, if the hostname of the URL is not yet stored in an existing record of the data structure as part of a logical group of hostnames, a new record is created for the logical group, and the hostname is stored in the new record. If the URL meets the criteria of a logical group for which a record exists, the hostname of the URL is added to the record, and a timestamp associated with the logical group is updated.

A source code example for detecting inactivity of webpages is shown in FIG. 3. In this example the data structure for tracking hostnames is queried when an event relevant to data deletion is triggered, where the query is performed at the level of logical groups of hostnames and looks for groups whose timestamps indicate that they have not been active for a specified amount of time, which is preferably configurable by system administrator. The code then determines whether any URLs associated with the hostnames in the logical group are currently accessed by a web browser tab. If no URLs associated with the hostnames in the logical group are currently accessed by a web browser tab, data stored by the web browser in association with any URL associated with the hostnames in the logical group are subsequently deleted. Otherwise, the logical group timestamp is updated to delay further checks of this group.

An example showing how sets of hostnames may be maintained by a Google Chrome™ web browser using IndexedDB is shown in FIG. 4. This example shows a data structure used to track logical groups of hostnames, where each logical group has a unique logical group ID, a list of hostnames in the group, and a timestamp indicating when the group was last checked for open tabs.

Figure 5:
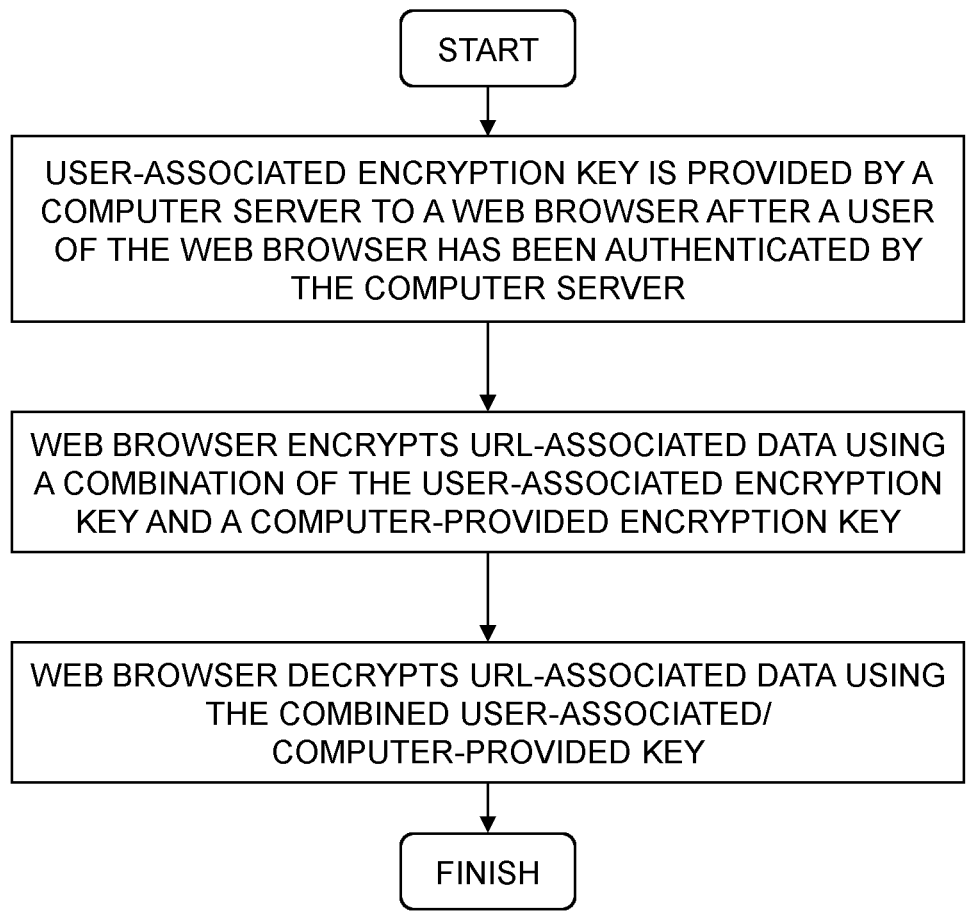
FIG. 5 is a simplified method of storing URL-related data on a computer, operative in accordance with an embodiment of the invention.

Reference is now made to FIG. 5, which is a simplified method of storing URL-related data on a computer, operative in accordance with an embodiment of the invention. In the method of FIG. 5, which may be employed by web browser 100 of FIG. 1A, a user-associated encryption key is provided to a web browser, such as to web browser 100, by a computer server, such as computer server 112 of FIG. 1A. The user-associated encryption key is provided to the web browser after a user of the web browser has been authenticated by the computer server, such as in accordance with techniques described in U.S. patent application Ser. No. 17/740,457. The user-associated encryption key is preferably uniquely associated with the user in combination with the web browser or a computer that hosts the web browser. All data that are stored by the web browser in association with URLs accessed by the user while using the web browser are stored on the computer that hosts the web browser after the data are encrypted by the web browser using an encryption key that is a combination of the user-associated encryption key and a computer-provided encryption key that the computer that hosts the web browser provides to the web browser in accordance with conventional techniques. The computer-provided encryption key may, for example, be provided by the Microsoft Windows™ Data Protection Application Programming Interface (DPAPI), or may be a randomly-generated key stored by the Keychain Access application of the Apple macOS™ operating system. The user-associated encryption key and computer-provided encryption key may be combined in accordance with conventional techniques, such as simple concatenation. The encrypted data may be stored on any data storage medium. Thereafter, when data that are encrypted in this fashion are needed by web browser, the web browser decrypts the data using the combined key.

The method of FIG. 5 may, for example, be implemented by web browsers based on the Google™ Chromium™ architecture by extending Chromium's implementation of CanonicalCookie to an EncryptedCanonicalCookie class that holds the value of CanonicalCookie that is encrypted using the combined user-associated/computer-provided encryption key, and that is decrypted when EncryptedCanonicalCookie::Value( ) is called by processes that hold the key, preferably just prior to needing the value in memory.

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for deleting web browser data, the method comprising:
    maintaining, by a computer-hosted web browser, a set of hostnames of Uniform Resource Locators,
        wherein a hostname of a Uniform Resource Locator is added by the computer-hosted web browser to the set of hostnames responsive to the Uniform Resource Locator being accessed by the computer-hosted web browser, and
        wherein the hostname of the Uniform Resource Locator is added by the computer-hosted web browser to the set of hostnames responsive to the computer-hosted web browser determining that each condition in a set of one or more predefined grouping conditions that define a logical group is met by the Uniform Resource Locator;
    determining, by the computer-hosted web browser, whether the computer-hosted web browser is currently accessing any Uniform Resource Locator associated with the hostnames in the set of hostnames; and
    deleting, by the computer-hosted web browser, one or more types of data maintained by the computer-hosted web browser in association with Uniform Resource Locators associated with the hostnames in the set of hostnames,
    wherein the deleting is performed in accordance with a predefined deletion policy that specifies the one or more types of data that are to be deleted and one or more predefined deletion conditions, and
    wherein the deleting is performed responsive to the computer-hosted web browser determining that each condition in the set of one or more predefined deletion conditions is met and determining that the computer-hosted web browser is not currently accessing any Uniform Resource Locator associated with the hostnames in the set of hostnames.

2. The method according to claim 1 wherein the predefined grouping conditions includes a condition that logically groups Uniform Resource Locators that have a predefined common Uniform Resource Locator portion.

3. The method according to claim 1 wherein the predefined grouping conditions includes a condition that logically groups Uniform Resource Locators that belong to a predefined group of Uniform Resource Locators.

4. The method according to claim 1 wherein the predefined grouping conditions includes a condition that logically groups Uniform Resource Locators that are associated with a predefined website category.

5. The method according to claim 1 wherein the predefined grouping conditions includes a condition that logically groups Uniform Resource Locators that are associated with a predefined risk reputation.

6. The method according to claim 1 wherein the deleting is performed after a predefined time period elapses after determining that the web browser is not currently accessing any Uniform Resource Locator associated with the hostnames in the set of hostnames.

7. The method according to claim 1 wherein the deletion policy specifies one or more logical groups of hostnames to which the deletion policy is to be applied.

* * * * *